United States Patent
Ou et al.

(10) Patent No.: US 11,269,902 B2
(45) Date of Patent: Mar. 8, 2022

(54) TIME SERIES DATA MANAGEMENT METHOD, DEVICE, AND APPARATUS

(71) Applicant: HUAWEI TECHNOLOGIES CO., LTD., Guangdong (CN)

(72) Inventors: Weijie Ou, Shenzhen (CN); Zhibiao Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 352 days.

(21) Appl. No.: 16/420,482

(22) Filed: May 23, 2019

(65) Prior Publication Data
US 2019/0278770 A1    Sep. 12, 2019

Related U.S. Application Data

(63) Continuation of application No. PCT/CN2017/111921, filed on Nov. 20, 2017.

(30) Foreign Application Priority Data

Nov. 25, 2016  (CN) .................. 201611056489.X

(51) Int. Cl.
*G06F 16/24* (2019.01)
*G06F 16/2458* (2019.01)
(Continued)

(52) U.S. Cl.
CPC ...... *G06F 16/2474* (2019.01); *G06F 16/2264* (2019.01); *G06F 17/175* (2013.01)

(58) Field of Classification Search
CPC ...... G06F 16/22; G06F 16/21; G06F 16/9537; G06F 16/86; G06F 16/2477; F06F 16/22
(Continued)

(56) References Cited

U.S. PATENT DOCUMENTS

| 5,978,794 A | 11/1999 | Agrawal et al. |
| 2006/0132473 A1* | 6/2006 | Fuller ............... G06F 3/1438 345/204 |
| 2009/0222596 A1* | 9/2009 | Flynn ............... G06F 3/0643 710/22 |

(Continued)

FOREIGN PATENT DOCUMENTS

| CN | 102193917 A | 9/2011 |
| CN | 102890722 A | 1/2013 |

(Continued)

OTHER PUBLICATIONS

Kaufmann et al., "Timeline Index: A Unified Data Structure for Processing Queries on Temporal Data in SAP HANA," SIGMOD'13, Jun. 22-27, 2013, New York, NY, USA, 12 pages.

(Continued)

*Primary Examiner* — Baoquoc N To
(74) *Attorney, Agent, or Firm* — Fish & Richardson P.C.

(57) ABSTRACT

This application discloses a time series data management method, device, and apparatus. A device receives a data query request, wherein the data query request includes an identifier of the first object. The device obtains first time series data corresponding to the first object in a target data table according to the identifier of the first object. The device determines a second storage location that is in a location index table and that is stored in a first storage location corresponding to the first object. Further, the device obtains second time series data of the first object and a third storage location corresponding to the second time series data that are stored in the second storage location, The device also obtains other time series data corresponding to the first object according to the third storage location.

16 Claims, 7 Drawing Sheets

(51) Int. Cl.
  *G06F 16/22* (2019.01)
  *G06F 17/17* (2006.01)
(58) Field of Classification Search
  USPC .......................................... 707/743, 803, 802
  See application file for complete search history.

(56) References Cited

U.S. PATENT DOCUMENTS

| | | | | |
|---|---|---|---|---|
| 2011/0296133 | A1* | 12/2011 | Flynn | G06F 3/0619 |
| | | | | 711/171 |
| 2012/0136874 | A1 | 5/2012 | Milby | |
| 2016/0042039 | A1* | 2/2016 | Kaufmann | G06F 16/2456 |
| | | | | 707/722 |
| 2016/0162370 | A1* | 6/2016 | Mehta | G06F 11/1451 |
| | | | | 707/610 |
| 2016/0357791 | A1* | 12/2016 | Levandoski | G06F 12/1009 |

FOREIGN PATENT DOCUMENTS

| | | |
|---|---|---|
| CN | 104156385 A | 11/2014 |
| CN | 104881481 A | 9/2015 |
| CN | 106776823 A | 5/2017 |

OTHER PUBLICATIONS

Kaufmann et al., "Comprehensive and Interactive Temporal Query Processing with SAP HANA," Proceedings of the VLDB Endowment, vol. 6, No. 12, Aug. 26-30, 2013, Riva del Garda, Trento, Italy, 4 pages.

PCT International Search Report and Written Opinion issued in International Application No. PCT/CN2017/111921 dated Feb. 26, 2018, 18 pages (with English translation).

* cited by examiner

|        | Column 1 | Column 2 | Column 3 | Column 4      | Column 5      |
|--------|----------|----------|----------|---------------|---------------|
| Row 1  | ID       | Gender   | Age      | Call duration | Home location |
| Row 2  | User A   | Male     | 28       | 3 min         | Beijing       |
| Row 3  | User B   | Male     | 30       | 1 min         | Tianjin       |
| Row 4  | User C   | Female   | 20       | 20 min        | Wuhan         |
| Row 5  | User A   | Male     | 28       | 10 min        | Beijing       |
| Row 6  | User C   | Female   | 20       | 6 min         | Wuhan         |
| Row 7  | User A   | Male     | 28       | 30 min        | Beijing       |

FIG. 1

TIME SERIES DATA MANAGEMENT METHOD, DEVICE, AND APPARATUS

CROSS-REFERENCE TO RELATED APPLICATIONS

This application is a continuation of International Application No. PCT/CN2017/111921, filed on Nov. 20, 2017, which claims priority to Chinese Patent Application No. 201611056489.X, filed on Nov. 25, 2016. The disclosures of the aforementioned applications are hereby incorporated by reference in their entireties.

TECHNICAL FIELD

This application relates to the field of database technologies, and in particular, to a time series data management method, device, and apparatus.

BACKGROUND

Massive data needs to be stored and operated in a plurality of fields such as teleservice quality management, network performance management, and Internet application analysis. Currently, massive data is usually stored in a form of a data table. The data table may include non-time series data (for example, data such as a user identifier, a gender, and a birthplace corresponding to an object) and time series data (for example, data such as call duration of an object within a time period, where the object is usually corresponding to a plurality of pieces of time series data in different time periods). A data operation may be a data query operation.

Currently, a method for storing and querying time series data is usually as follows: Each time a data storage instruction carrying time series data of an object is received, a new row may be added to a data table, and the time series data carried in the data storage instruction may be recorded in a corresponding location in the row. That is, the object is corresponding to a plurality of rows of data in the data table, and time series data in each row is corresponding to a different time period. Each time a data query request used to query the time series data of the object is received, the data table may be checked from the first row to the last row, to determine all the rows corresponding to the object, and obtain the time series data in each row.

In a process of implementing this application, the inventor finds that a related technology has at least the following problem:

Based on the foregoing processing manner of querying time series data, when the time series data of the object is queried, the data table needs to be checked row by row until the last row. Because a data amount in the data table is usually quite large, efficiency of querying time series data is relatively low.

SUMMARY

To resolve a problem that efficiency of querying time series data is relatively low, embodiments of the present invention provide a time series data management method, device, and apparatus.

The technical solutions are as follows:

According to a first aspect, a time series data management method is provided. The method may be used to query time series data of an object, and the method includes: receiving a data query request used to query time series data of a first object, where the data query request includes an identifier of the first object; obtaining, according to the identifier of the first object, first time series data corresponding to the first object in a target data table, where the target data table records a plurality of pieces of time series data corresponding to a plurality of objects, and the plurality of objects are in a one-to-one correspondence with the plurality of pieces of time series data in the target data table; determining a second storage location that is in a location index table and that is stored in a first storage location corresponding to the first object, where the location index table is used to record storage locations of the plurality of pieces of time series data corresponding to the plurality of objects in the target data table, and for each object in the plurality of objects, a time series of time series data that is of the object and that is indicated by the storage locations in the location index table is before a time series of time series data of the object that is recorded in the target data table; obtaining second time series data of the first object and a third storage location corresponding to the second time series data that are stored in the second storage location, where a time series of the second time series data is before that of the first time series data, and the third storage location is used to store third time series data of the first object and a fourth storage location corresponding to the third time series data; and obtaining, according to the third storage location, other time series data corresponding to the first object.

In this embodiment of the present invention, the target data table records only the time series data of each object. When the data query request used to query the time series data of the first object is received, the first time series data corresponding to the first object may be obtained from the target data table, and the second time series data of the first object and the third storage location corresponding to the second time series data may be obtained from the second storage location that is in the location index table and that is stored in the first storage location corresponding to the first object. The time series of the second time series data may be before that of the first time series data, and the time series of the second time series data and the time series of the first time series data are adjacent. Further, the other time series data corresponding to the first object is obtained according to the third storage location. In this way, when the time series data of the first object is obtained, the time series data corresponding to the first object only needs to be obtained from the target data table. Further, the other time series data of the first object may be directly queried in a storage location that is in the location index table and that is recorded in the first storage location corresponding to the first object, and the target data table does not need to be checked row by row. Therefore, efficiency of querying time series data is improved.

In addition, the data query request used to query the time series data of the first object may further carry query time information. In this case, after obtaining all time series data corresponding to the first object, a time series data management device may obtain, by means of screening, time series data whose time information matches the query time information carried in the data query request.

In a possible implementation, the obtaining, according to the third storage location, other time series data corresponding to the first object includes: obtaining the third time series data and the fourth storage location corresponding to the third time series data that are stored in the third storage location; and obtaining fourth time series data and a fifth storage location corresponding to the fourth time series data that are stored in the fourth storage location until all time series data corresponding to the first object is obtained.

In this embodiment of the present invention, the storage locations recorded in the location index table may be in a one-to-one correspondence with the objects in the target data table, that is, for each object in the target data table, the location index table records only a storage location of time series data corresponding to the object. In this way, when there is a need to search for the time series data of the first object, the third time series data of the first object and the fourth storage location may be obtained from the third storage location after the second time series data and the third storage location are obtained according to the location index table. Further, the fourth time series data and the fifth storage location may be obtained from the fourth storage location until all time series data corresponding to the first object is obtained.

According to a second aspect, a time series data management method is provided. The method is used to store time series data of each object, and the method includes: receiving a first data storage instruction, where the first data storage instruction includes first time series data of a first object and an identifier of the first object; determining, according to the identifier of the first object, second time series data that is corresponding to the first object and that is recorded in a target data table, where the target data table records a plurality of pieces of time series data corresponding to a plurality of objects, and the plurality of objects are in a one-to-one correspondence with the plurality of pieces of time series data in the target data table; replacing the second time series data in the target data table with the first time series data; storing the second time series data in a first data storage block; and storing, in a first storage location corresponding to the first object in a location index table, a second storage location in which the second time series data in the first data storage block is located, where a time series of the second time series data is before that of the first time series data, the location index table is used to store storage locations of the plurality of pieces of time series data corresponding to the plurality of objects in the target data table, and for each object in the plurality of objects, a time series of time series data that is of the object and that is indicated in the location index table is before a time series of time series data of the object that is recorded in the target data table.

The first data storage block may be any data storage block in data storage blocks other than the target data table, and may be continuous storage space.

In this embodiment of the present invention, during time series data management, all time series data is no longer stored in the target data table in a manner of one-by-one addition, but only latest time series data is stored in the target data table in a manner of updating and replacement. That is, each object is corresponding to only one row of data in the target data table, and time series data replaced with the latest time series data may be stored in at least one data storage block other than the target data table. When the time series data of the first object needs to be queried, the time series data corresponding to the first object only needs to be obtained from the target data table. Further, other time series data of the first object may be directly queried in a storage location that is in the location index table and that is recorded in the first storage location corresponding to the first object, and the target data table does not need to be checked row by row. Therefore, efficiency of querying time series data is improved.

In addition, the time series of the second time series data may be before that of the first time series data, and the time series of the second time series data and the time series of the first time series data are adjacent. The storage locations recorded in the location index table may be in a one-to-one correspondence with the objects in the target data table, that is, for each object in the target data table, the location index table records only a storage location of time series data corresponding to the object.

In a possible implementation, before the receiving a first data storage instruction, the method further includes: receiving a second data storage instruction, where the second data storage instruction includes the second time series data of the first object and the identifier of the first object; determining, according to the identifier of the first object, third time series data that is corresponding to the first object and that is recorded in the target data table; replacing the third time series data in the target data table with the second time series data; storing the third time series data in a second data storage block; and storing, in the first storage location, a third storage location in which the third time series data in the second data storage block is located.

In this embodiment of the present invention, each time a data storage instruction carrying time series data of the first object is received, time series data that is corresponding to the first object and that is stored in the target data table may be replaced with the time series data carried in the data storage instruction. Specifically, when the time series data corresponding to the first object in the target data table is the third time series data, and the second data storage instruction carries the second time series data of the first object, after a time series data management device receives the second data storage instruction, the time series data management device may replace the third time series data in a target data table with the second time series data, and may store the third time series data in the second data storage block. The second data storage block and the first data storage block may be a same data storage block, or may be different data storage blocks. Further, the third storage location in which the third time series data in the second data storage block is located may be stored in the first storage location.

In a possible implementation, the storing the second time series data in a first data storage block includes: storing a mapping relationship between the third storage location and the second time series data in the first data storage block, where the mapping relationship includes the third storage location and the second time series data.

In this embodiment of the present invention, each object is usually corresponding to a plurality of pieces of time series data. To ensure that all the time series data corresponding to each object can be obtained, when the second time series data is stored, the mapping relationship between the second time series data and the storage location of the third time series data replaced with the second time series data also needs to be stored in the first data storage block. Therefore, an association relationship between the second time series data and the third time series data is ensured. In this way, when the time series data of the first object is queried, all time series data corresponding to the first object may be gradually found according to an association relationship between time series data and other time series data replaced with the time series data, and the target data table does not need to be checked row by row. Therefore, efficiency of querying time series data is improved.

In a possible implementation, the storing, in a first storage location corresponding to the first object in a location index table, a second storage location in which the second time series data in the first data storage block is located includes: replacing the third storage location stored in the first storage location with the second storage location.

In this embodiment of the present invention, when the third time series data in the target data table is replaced with the second time series data, the first storage location corresponding to the first object in the location index table may record the storage location of the third time series data, that is, the third storage location. Further, when the second time series data in the target data table is replaced with the first time series data, the third storage location recorded in the first storage location may be replaced with a current storage location of the second time series data (that is, the second storage location). In this way, the location index table stores only a storage location of time series data corresponding to the first object, and storage locations of other time series data are stored in the data storage block. Further, when the other time series data corresponding to the first object other than the first time series data is searched for, the second time series data corresponding to the first object only needs to be obtained from the storage locations recorded in the location index table. Further, the other time series data of the first object may be queried according to the second time series data, and the location index table does not need to be checked row by row. Therefore, efficiency of querying time series data is improved.

In a possible implementation, the storing the second time series data in a first data storage block includes: when a data storage amount of the first data storage block reaches an upper storage limit, creating a third data storage block, and storing the second time series data in the third data storage block; and when the data storage amount of the first data storage block does not reach the upper storage limit, storing the second time series data in the first data storage block.

In this embodiment of the present invention, when the second time series data is stored, a new data storage block (that is, the third data storage block) may be created when the data storage amount of the first data storage block reaches the upper storage limit, to store the second time series data in the third data storage block, and the second time series data may be stored in the first data storage block when the data storage amount of the first data storage block does not reach the upper storage limit. In this way, time series data is stored in a new data storage block only when a data storage amount of an established data storage block reaches an upper storage limit. When the data storage amount of the established data storage block does not reach the upper storage limit, the time series data is still stored in the data storage block. Further, a problem that the established data storage block has residual storage space may be avoided, so as to improve utilization of storage space.

In a possible implementation, the storing the second time series data in a first data storage block includes: determining, from at least one data storage block other than the target data table according to time information of the second time series data, the first data storage block matching the time information of the second time series data, where the at least one data storage block is used to store time series data replaced from the target data table; and storing the second time series data in the determined first data storage block.

Time information may be a generation time of time series data, may be a recording time of time series data, or may be an editing time of time series data. That is, the time information of the time series data may be one of the three.

In this embodiment of the present invention, the at least one data storage block other than the target data table may be corresponding to time information. Further, when the second time series data is stored, the second time series data may be stored in the first data storage block matching the time information of the second time series data. In this way, time series data at different time may be stored in different data storage blocks, so as to help a user search for time series data within a specified time interval range.

In a possible implementation, the method further includes: performing, at an interval of a preset detection period, data storage amount detection on a data storage block that is in the at least one data storage block other than the target data table and on which persistency is not performed; and storing, in a persistent file according to a sequence of updating time, target data in a data storage block whose data storage amount reaches an upper storage limit and that is in the data storage block on which persistency is not performed.

The persistency may be that data stored in a data storage block in memory space is stored in a storage device (for example, a magnetic disk) that can persistently store the data, and the persistent file may be a file in the storage device that can persistently store the data. The updating time may be a time at which the data storage amount of the data storage block reaches the upper storage limit. The target data may be time series data stored in the data storage block and a storage location corresponding to the time series data.

In this embodiment of the present invention, persistency processing may be performed on target data in each data storage block, so as to avoid a problem of data loss caused by exceptions such as a system failure, and ensure security and reliability of data storage.

In a possible implementation, the method further includes: when a data recovery request is received, obtaining the target data stored in the persistent file; and storing to-be-recovered target data in a data storage block in a memory.

In a possible implementation, the method further includes: obtaining, at an interval of a preset detection period, each index entry that is in the location index table and that changes compared with a previous detection period; and storing each obtained index entry in the persistent file according to a sequence of updating time.

The index entry may include a mapping relationship between an object and a storage location recorded in the location index table. The updating time may be a creation time of the index entry and a recording time of a storage location in the index entry.

In this embodiment of the present invention, persistency processing may be performed on each index entry in the location index table, so as to avoid a problem of data loss caused by exceptions such as a system failure, and ensure security and reliability of data storage.

In a possible implementation, the method further includes: when the data recovery request is received, traversing the persistent file according to the sequence of updating time to successively obtain at least one index entry stored in the persistent file; when the persistent file includes a plurality of index entries for a same object, obtaining an index entry with a latest updating time from the plurality of index entries for the same object; and recovering the obtained at least one index entry to the memory.

According to a third aspect, a time series data management device is provided. The device may include a processor, a memory, and a transceiver. The memory is configured to store a program and data, the processor is configured to execute the program stored in the memory, and the processor executes the program to implement the time series data management method according to the first aspect and each possible implementation of the first aspect. For related details and technical effects, refer to the first aspect and each implementation of the first aspect. Details are not described herein again.

According to a fourth aspect, a time series data management device is provided. The device may include a processor, a memory, and a transceiver. The memory is configured to store a program and data, the processor is configured to execute the program stored in the memory, and the processor executes the program to implement the time series data management method according to the second aspect and each possible implementation of the second aspect. For related details and technical effects, refer to the second aspect and each implementation of the second aspect. Details are not described herein again.

According to a fifth aspect, a time series data management apparatus is provided. The apparatus is configured to query time series data of an object, and the apparatus includes: a receiving module, configured to receive a data query request used to query time series data of a first object, where the data query request includes an identifier of the first object; an obtaining module, configured to obtain, according to the identifier of the first object, first time series data corresponding to the first object in a target data table, where the target data table records a plurality of pieces of time series data corresponding to a plurality of objects, and the plurality of objects are in a one-to-one correspondence with the plurality of pieces of time series data in the target data table; and a determining module, configured to determine a second storage location that is in a location index table and that is stored in a first storage location corresponding to the first object, where the location index table is used to record storage locations of the plurality of pieces of time series data corresponding to the plurality of objects in the target data table, and for each object in the plurality of objects, a time series of time series data that is of the object and that is indicated by the storage locations in the location index table is before a time series of time series data of the object that is recorded in the target data table, where the obtaining module is further configured to: obtain second time series data of the first object and a third storage location corresponding to the second time series data that are stored in the second storage location, where a time series of the second time series data is before that of the first time series data, and the third storage location is used to store third time series data of the first object and a fourth storage location corresponding to the third time series data; and obtain, according to the third storage location, other time series data corresponding to the first object.

The modules included in the apparatus are configured to implement the time series data management method according to the first aspect and each possible implementation of the first aspect. For related details and technical effects, refer to the first aspect and each implementation of the first aspect. Details are not described herein again.

According to a sixth aspect, a time series data management apparatus is provided. The apparatus is configured to store time series data of each object, and the apparatus includes: a receiving module, configured to receive a first data storage instruction, where the first data storage instruction includes first time series data of a first object and an identifier of the first object; a determining module, configured to determine, according to the identifier of the first object, second time series data that is corresponding to the first object and that is recorded in a target data table, where the target data table records a plurality of pieces of time series data corresponding to a plurality of objects, and the plurality of objects are in a one-to-one correspondence with the plurality of pieces of time series data in the target data table; a replacement module, configured to replace the second time series data in the target data table with the first time series data; and a storage module, configured to: store the second time series data in a first data storage block; and store, in a first storage location corresponding to the first object in a location index table, a second storage location in which the second time series data in the first data storage block is located, where a time series of the second time series data is before that of the first time series data, the location index table is used to store storage locations of the plurality of pieces of time series data corresponding to the plurality of objects in the target data table, and for each object in the plurality of objects, a time series of time series data that is of the object and that is indicated in the location index table is before a time series of time series data of the object that is recorded in the target data table.

The modules included in the apparatus are configured to implement the time series data management method according to the second aspect and each possible implementation of the second aspect. For related details and technical effects, refer to the second aspect and each implementation of the second aspect. Details are not described herein again.

The technical solutions provided in the embodiments of the present invention bring the following beneficial effects:

In the embodiments of the present invention, during time series data management, all time series data is no longer stored in the target data table in a manner of one-by-one addition, but only latest time series data is stored in the target data table in a manner of updating and replacement. That is, each object is corresponding to only one row of data in the target data table, and replaced time series data may be stored in at least one data storage block other than the target data table. When the time series data of the first object needs to be queried, the time series data corresponding to the first object only needs to be obtained from the target data table. Further, other time series data of the first object may be directly queried in a storage location that is in the location index table and that is recorded in the first storage location corresponding to the first object, and the target data table does not need to be checked row by row. Therefore, efficiency of querying time series data is improved.

BRIEF DESCRIPTION OF DRAWINGS

FIG. 1 is a schematic diagram of a table structure of an existing data table;

DESCRIPTION OF EMBODIMENTS

Figure 2:
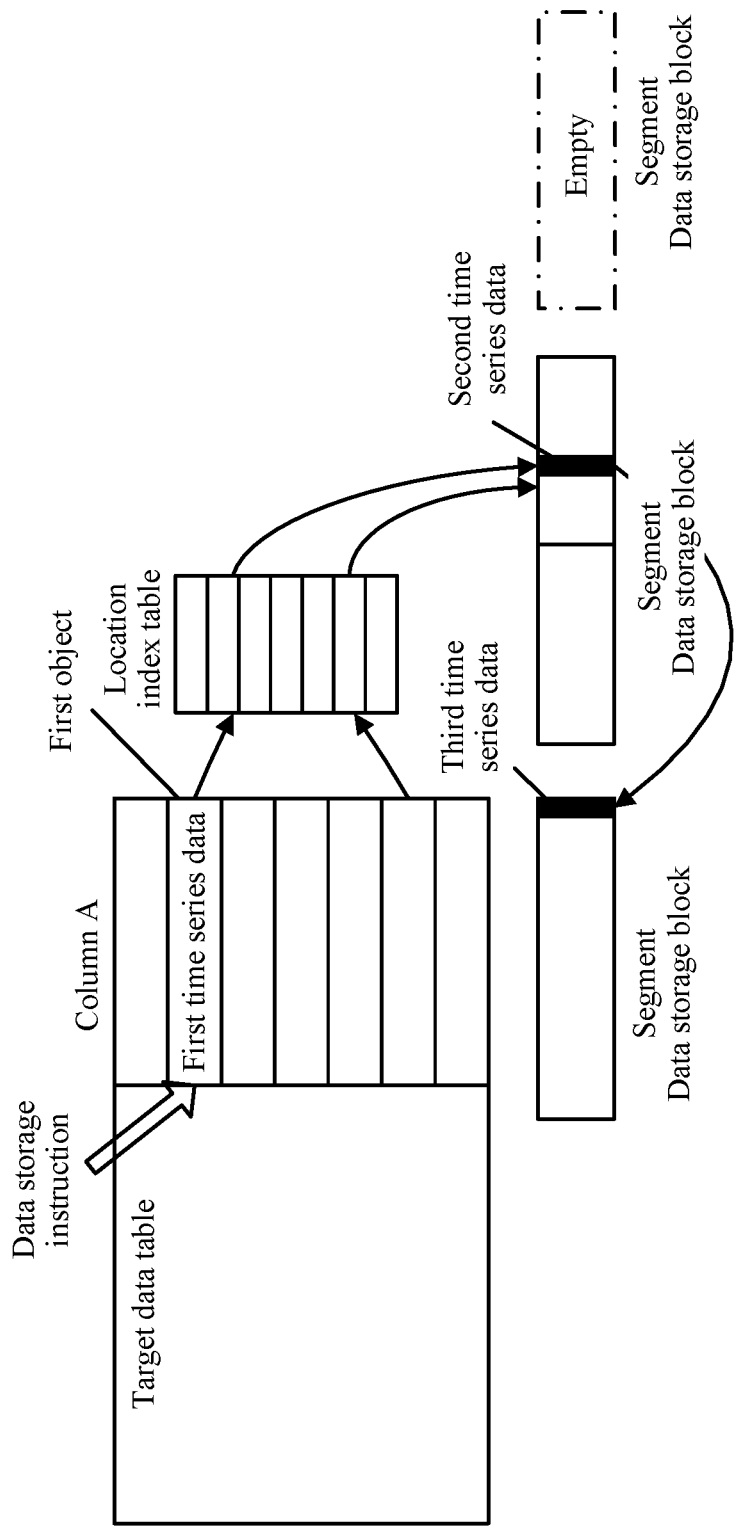
FIG. 2 is an architectural diagram of a time series data management system according to an embodiment of the present invention.

The following describes the technical solutions in the embodiments of the present invention with reference to the accompanying drawings in the embodiments of the present invention.

A database is currently a frequently-used data storage manner, and stores each type of data in a form that may include but is not limited to a data table. According to different data properties, data is classified into a type that may include but is not limited to the following types: time series data, location data (data indicating transaction coordinates such as two-dimensional coordinate points, three-dimensional coordinate points, and location description information of a transaction), and attribute data (data indicating a transaction attribute). The time series data may be different values of some time-related attributes at different time, that is, the values of these attributes vary with time, and are for different data of a same attribute at different time. For example, call duration may be one of the time series data, that is, different data records for a same attribute "call duration" at different time. In the database, the time series data is usually stored in a same column of a data table of the database. For example, a column attribute of a column of the database is corresponding to the call duration, various pieces of call duration data corresponding to different time may be stored in the column.

Referring to FIG. 1, FIG. 1 shows a schematic diagram of a table structure of an existing data table. In the data table shown in FIG. 1, information such as genders, ages, call duration, and home locations of different users may be stored. The call duration may be one of the time series data, and call duration corresponding to a same user at different time is not exactly the same. A gender, an age, a home location, and the like of the same user may be fixed data.

In a current data table, all data corresponding to each user needs to be recorded. For example, when a new piece of call duration of a user A is added, a new row needs to be added to the data table to store the call duration (Row2, Row5, and Row7 in the data table shown in FIG. 1).

However, in actual application, for example, in a service such as teleservice quality management, network performance management, or Internet application analysis, a data amount is extremely large, and a large amount of new data is constantly generated. In a current data management manner, a large quantity of new rows need to be constantly added to the data table to record the new data. Consequently, a data storage amount of the entire data table is extremely large and redundant. Particularly, to ensure data integrity, a row of complete record is added even for data updating in a column, for example, the 7th row Row 7 in FIG. 1. When the call duration of the user A is updated, a complete row (Row7) needs to be added to complete updating of the call duration of the user A. Consequently, the data table stores a large amount of duplicated data, and the data storage amount in the data table is further increased.

Large redundancy of the data table causes many problems: When data query is performed based on the data table, complete traversal needs to be performed on the data table. A redundant data table leads to an increased traversal time. Consequently, search efficiency is low, and running load of the system is increased. Particularly, when the data table is a data table in a memory database, a redundant data table causes higher memory storage costs, and severely affects running efficiency of the system.

Referring to FIG. 2, FIG. 2 shows an architectural diagram of a time series data management system according to an embodiment of the present invention. In an application scenario of the present invention, an architecture of the time series data management system may include at least a target data table, at least one data storage block (which can be called Segment), a location index table, and a persistent file. The target data table may be any data table including an attribute of time series data.

In FIG. 2, Column A is a time series data column used to store time series data in a data table, and each row in Column A is used as an object to store time series data of different persons or transactions (which may be referred to as objects). The location index table includes a storage location corresponding to each object in Column A. The location index table may be used to record storage locations of a plurality of pieces of time series data corresponding to a plurality of objects in the target data table. For each object in the plurality of objects, a time series of time series data that is of the object and that is indicated by the storage locations in the location index table is before a time series of time series data of the object that is recorded in the target data table. Replaced time series data of each object is stored in the at least one data storage block other than the data table. The persistent file may be used to persistently store the storage locations recorded in the location index table and the time series data stored in the at least one data storage block, so as to improve data storage security. The persistent file may be a file in a permanent memory such as a magnetic disk.

In a embodiment of the present invention, time series data management method may be implemented based on a database management system. The database management system may be a function module implemented based on software.

Figure 3:
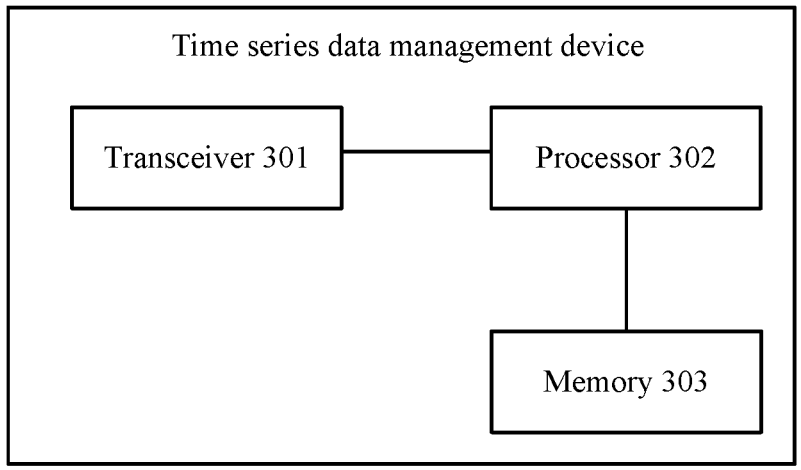
FIG. 3 is a structural block diagram of a time series data management device according to an embodiment of the present invention.

In an embodiment of the present invention, the database management system may specifically run on a time series data management device, for example, may be a terminal or a server having a time series data management function. Referring to FIG. 3, FIG. 3 shows a structural block diagram of a time series data management device according to an embodiment of the present invention. The time series data management device may include at least a transceiver 301, a processor 302, and a memory 303. The processor 302 may be separately electrically connected to the transceiver 301 and the memory 303. A connection manner in FIG. 3 is merely an example. A connection among the processor, the memory, and the transceiver may also be similar to a connection in a general-purpose computer architecture. That is, the processor, the memory, and the transceiver are connected by using a bus. This is not limited in this embodiment of the present invention. The transceiver 301 may be configured to send and receive data. The memory 303 may be configured to store a program and data. The processor 302 runs the program stored in the memory 303, to execute various function applications and data processing. The memory 303 may mainly include a program storage area and a data storage area. The program storage area may store an operating system, an application program required by at least one function (for example, a sound playing function or an image playing function), and the like. The data storage area may store data (for example, audio data, a phone book, or time series data) created according to use of the time series data management device, and the like. The data storage area may include a data storage block for data storage in a memory. In addition, the memory 303 may include a high-speed random access memory, and may further include a non-volatile memory such as at least one magnetic disk storage device, a flash memory, or another volatile solid-state storage device. Correspondingly, the memory 303 may further include a memory controller to provide the processor 302 and the transceiver 301 with access to the memory 303. The processor 302 is a control center of the time series data management device, and connects all parts of the entire time series data management device by using various interfaces and lines. By running or executing the software program and/or the module stored in the memory 303 and invoking the data stored in the memory 303, the processor 302 executes various functions of the time series data management device and data processing, so as to perform overall monitoring on the time series data management device. Optionally, the processor 302 may include one or more processing cores. The processor 302 may integrate an application processor and a modem processor. The application processor mainly processes an operating system, a user interface, an application program, and the like, and the modem processor mainly processes wireless communication. It may be understood that the foregoing modem processor may not be integrated into the processor 302.

Figure 4:
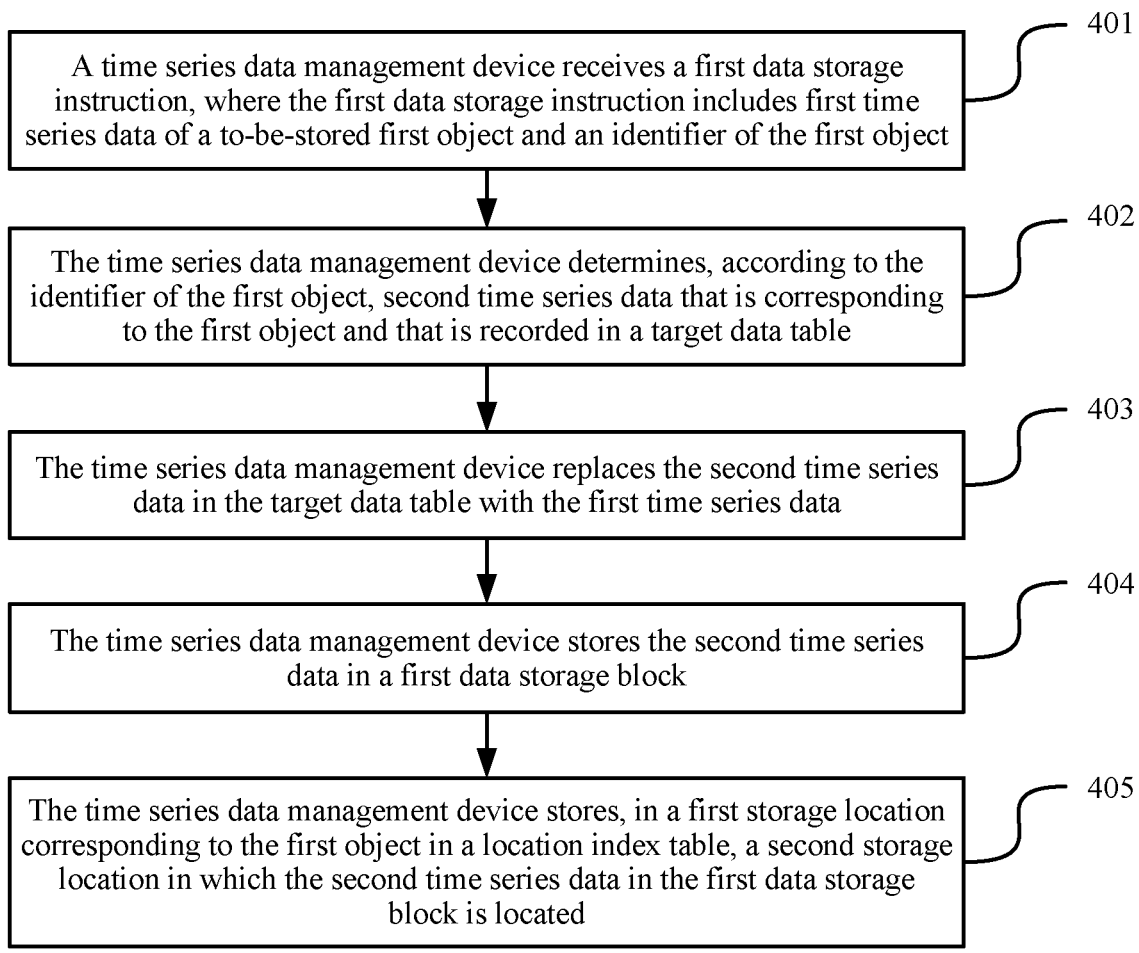
FIG. 4 is a step flowchart of a time series data management method according to an embodiment of the present invention.

Referring to FIG. 4, FIG. 4 shows a step flowchart of a time series data management method according to an embodiment of the present invention. The method may be used to store time series data of each object. In this embodiment, the time series data management method includes the following steps.

Step 401: A time series data management device receives a first data storage instruction, where the first data storage instruction includes first time series data of a first object and an identifier of the first object.

The first object may be one of a plurality of objects included in a target data table, and the identifier of the first object may be a user identifier recorded in the target data table.

In implementation, the time series data management device may pre-store the target data table, and the target data table includes at least one time series data column (the time series data column may be a column of an attribute of time series data). The time series data management device further pre-stores a location index table corresponding to the time series data column in the target data table.

When new data is generated, a user may send a data storage instruction (which may be referred to as the first data storage instruction) to the time series data management device by using a terminal. The first data storage instruction may carry the first time series data of the first object and the identifier of the first object. After receiving the first data storage instruction, the time series data management device may parse the first data storage instruction to obtain the first time series data of the first object and the identifier of the first object that are carried in the first data storage instruction. The first time series data may include an attribute of the first time series data and the first time series data.

This step may be specifically implemented by the transceiver 301.

Step 402: The time series data management device determines, according to the identifier of the first object, second time series data that is corresponding to the first object and that is recorded in a target data table, where the target data table records a plurality of pieces of time series data corresponding to a plurality of objects, and the plurality of objects are in a one-to-one correspondence with the plurality of pieces of time series data in the target data table.

In implementation, after obtaining the identifier and the first time series data of the first object that are carried in the first data storage instruction, the time series data management device may determine, in the target data table, a row in which the identifier of the first object is located and a column in which the attribute of the first time series data is located, so as to determine data recorded in the determined row and column as the second time series data corresponding to the first object.

Step 403: The time series data management device replaces the second time series data in the target data table with the first time series data.

As described above, the target data table may store only latest time series data of each object in this embodiment. Replaced data of each object may be stored in any proper location other than the data table. Therefore, after the second time series data is determined, the second time series data of the first object that is stored in the target data table may be replaced with the first time series data.

This step may be specifically implemented by the processor 302.

Step 404: The time series data management device stores the second time series data in a first data storage block.

The first data storage block may be continuous storage space in a memory.

Step 405: The time series data management device stores, in a first storage location corresponding to the first object in a location index table, a second storage location in which the second time series data in the first data storage block is located, where a time series of the second time series data is before that of the first time series data, the location index table is used to store storage locations of the plurality of pieces of time series data corresponding to the plurality of objects in the target data table, and for each object in the plurality of objects, a time series of time series data that is of the object and that is indicated in the location index table is before a time series of time series data of the object that is recorded in the target data table.

The first data storage block may be any data storage block included in the time series data management device.

In implementation, the location index table may include an index entry corresponding to each object in a target index table. The index entry may include a mapping relationship between an object and a storage location of other time series data corresponding to the object. Specifically, each index entry may include an identifier of the object and the storage location of the other time series data of the object. A location of the storage location that is in the index entry and that stores the other time series data of the object is a storage location corresponding to the object in the location index table. That is, a location of a storage location that is in a first index entry corresponding to the first object and that stores the time series data of the first object is the first storage location corresponding to the first object in the location index table.

After storing the second time series data of the first object in the first data storage block, the time series data management device may determine the first storage location corresponding to the identifier of the first object in the location index table, that is, may determine, in the location index table, an index entry in which the identifier of the first object is located. Further, the time series data management device may store, in the first storage location, the second storage location in which the second time series data in the first data storage block is located. A time series of the second time series data may be before that of the first time series data, and is adjacent to the time series of the first time series data (that is, in terms of a time series, the second time series data may be previous time series data of the first time series data). The location index table is used to store the storage locations of the plurality of pieces of time series data corresponding to the plurality of objects in the target data table (further, the storage locations recorded in the location index table may be in a one-to-one correspondence with the objects). For each object in the plurality of objects, the time series of the time series data that is of the object and that is indicated in the location index table is before that of the time series data of the object that is recorded in the target data table. Further, in terms of a time series, the time series data of the object that is indicated in the location index table may be previous time series data of the time series data that is of the object and that is recorded in the target data table.

This step may be specifically implemented by the processor 302.

Optionally, a processing procedure of storing the second time series data of the first object in the target data table may be as follows: The time series data management device receives a second data storage instruction, where the second data storage instruction includes the second time series data of the first object and the identifier of the first object. The time series data management device determines, according to the identifier of the first object, third time series data that is corresponding to the first object and that is recorded in the target data table, replaces the third time series data in the target data table with the second time series data, stores the third time series data in a second data storage block, and stores, in the first storage location, a third storage location in which the third time series data in the second data storage block is located.

In implementation, a receiving moment of the second data storage instruction is earlier than a receiving moment of the first data storage instruction. When the second data storage instruction is received, time series data that is corresponding to the first object and that is recorded in the target data table is the third time series data. In terms of a time series, the third time series data may be previous time series data of the second time series data. After receiving the second data storage instruction, the time series data management device may replace the third time series data in the target data table with the second time series data, and store the replaced third time series data in the second data storage block other than the target data table. The second data storage block and the first data storage block may be a same data storage block, or may be different data storage blocks. After storing the third time series data in the second data storage block, the time series data management device may store, in the first storage location, the third storage location in which the third time series data in the second data storage block is located.

This step may be specifically implemented by the transceiver 301 and the processor 302 together.

Optionally, there may be one or more pieces of other time series data corresponding to the first object. Therefore, when there are a plurality of pieces of other time series data corresponding to the first object, to facilitate subsequent time series data query, all time series data of the first object may be obtained. When the other time series data of the first object is stored, storage locations of the other time series data in a data storage block further need to be stored in addition to the other time series data. That is, when the second time series data is stored, the third storage location may be further stored accordingly. Correspondingly, a processing procedure of step 404 may be as follows: The time series data management device stores a mapping relationship between the third storage location and the second time series data in the first data storage block. The mapping relationship includes the third storage location and the second time series data.

In implementation, after replacing the second time series data, the time series data management device may further obtain the third storage location stored in the first storage location in the location index table. Further, the mapping relationship between the third storage location and the second time series data may be stored in the first data storage block. The second time series data and the third storage location may be stored as one entry in the first data storage block. The third storage location and the second time series data may be stored as a 2-tuple in the first data storage block.

This processing procedure may be specifically implemented by the processor 302.

Further, after the second time series data of the first object is completely stored, data stored in the first storage location in the location index table further needs to be updated. Correspondingly, a processing procedure of step 405 may be as follows: The time series data management device replaces the third storage location stored in the first storage location with the second storage location. That is, the storage locations recorded in the location index table are in a one-to-one correspondence with the objects in the target data table. Each time it is learned that the time series data corresponding to the first object in the target data table is updated, the data in the first storage location corresponding to the first object in the location index table may be updated accordingly.

This processing procedure may be specifically implemented by the processor 302.

Optionally, when the second time series data is stored, the second time series data may be stored in a data storage block whose data storage amount does not reach an upper storage limit. Correspondingly, a processing procedure of step 404 may be as follows: When a data storage amount of the first data storage block reaches an upper storage limit, the time series data management device creates a third data storage block, and stores the second time series data in the third data storage block; and when the data storage amount of the first data storage block does not reach the upper storage limit, the time series data management device stores the second time series data in the first data storage block.

In implementation, when storing the second time series data in a data storage block other than the target data table, the time series data management device may first determine whether there is currently a data storage block whose data storage amount does not reach an upper storage limit, that is, may determine whether the data storage amount of the first data storage block reaches the upper storage limit. If the data storage amount of the first data storage block does not reach an upper storage limit, the time series data management device may store the second time series data in the first data storage block. If the data storage amount of the first data storage block reaches the upper storage limit, the time series data management device may create the third data storage block, and store the second time series data in the third data storage block.

This processing procedure may be specifically implemented by the processor 302.

Optionally, each data storage block shown in FIG. 2 may be corresponding to time information. For example, time information corresponding to a data storage block is 21:00 to 22:00, and time series data that may be stored in the data storage block may be time series data whose time information falls within a time interval from 21:00 to 22:00. Correspondingly, a processing procedure of step 404 may be as follows: The time series data management device determines, from at least one data storage block other than the target data table according to time information of the second time series data, the first data storage block matching the time information of the second time series data. The at least one data storage block is used to store time series data replaced from the target data table. The time series data management device stores the second time series data in the determined first data storage block.

Time information of time series data may be a generation time of the time series data, may be an editing time of the time series data, or may be a recording time of the time series data.

In implementation, the time series data management device may pre-store the time information corresponding to each data storage block and the time information of the time series data. The time series data may include the time series data and the time information of the time series data. After replacing the second time series data from the target data table, the time series data management device may determine, from all data storage blocks, the first data storage block matching the time information of the second time series data. The at least one data storage block is used to store the time series data replaced from the target data table. Further, the time series data management device may store the second time series data in the determined first data storage block.

This processing procedure may be specifically implemented by the processor 302.

Further, in this embodiment of the present invention, to ensure security and reliability of data storage, persistency processing may be performed on target data in the data storage block and/or each index entry in the location index table (a mapping relationship between each object and a storage location of time series data).

Specifically, a procedure of performing persistency processing on the target data in the data storage block may be as follows: The time series data management device performs, at an interval of a preset detection period, data storage amount detection on a data storage block that is in the at least one data storage block other than the target data table and on which persistency is not performed, and stores, in a persistent file according to a sequence of updating time, target data in a data storage block whose data storage amount reaches an upper storage limit and that is in the data storage block on which persistency is not performed.

The persistency may be that data stored in a data storage block in memory space is stored in a storage device (for example, a magnetic disk) that can persistently store the data, and the persistent file may be a file in the storage device that can persistently store the data. The updating time may be a time at which the data storage amount of the data storage block reaches the upper storage limit. The target data may be time series data stored in the data storage block and a storage location corresponding to the time series data.

In implementation, the time series data management device may perform, at the interval of the preset detection period, data storage amount detection on the data storage block that is in the at least one data storage block other than the target data table and on which persistency is not performed. That is, the time series data management device may perform data storage amount detection on a data storage block on which persistency is performed before a current detection period, to determine whether a data storage amount of the data storage block reaches an upper storage limit. When detecting that a data storage amount of a data storage block reaches an upper storage limit, the time series data management device may determine that the data storage block is a complete data storage block, and may store data in the data storage block in the persistent file according to a sequence of updating time corresponding to the target data in the data storage block. For example, the preset detection period is one hour, and the time series data management device starts to perform data storage amount detection on the data storage block other than the target data table at 9:00. Currently existing data storage blocks are a, b, and c, and data storage amounts of a, b, and c have reached an upper storage limit. The time series data management device may perform data storage amount detection on all the data storage blocks other than the target data table at 9:00. In this case, the time series data management device detects that data storage amounts of a and b reach an upper storage limit. Further, the time series data management device may store target data in a and b in the persistent file. Then, the time series data management device may perform data storage amount detection on a data storage block other than a and b at 10:00. When detecting a data storage block whose data storage amount reaches an upper storage limit, the time series data management device may store the data storage block in the persistent file according to a sequence of updating time, and place the target data in the data storage block after the data in a and b. In addition, when performing persistency processing on the target data in the data storage block, the time series data management device may further perform persistency processing on the storage location of the target data (that is, the data storage block in which the target data is located). That is, when performing persistency processing, the time series data management device may further store an identifier of the data storage block (that is, an address corresponding to the data storage block).

This step may be specifically implemented by the processor 302.

Optionally, the time series data management device may further recover data in the persistent file to the data storage block in the memory. Correspondingly, a processing procedure may be as follows: When receiving a data recovery request, the time series data management device may obtain the target data stored in the persistent file, and store to-be-recovered target data in the data storage block in the memory.

In this embodiment, when a system is recovered from a failure and restarted, the to-be-recovered target data may be stored in the data storage block in the memory from the persistent file according to the data recovery request generated during the restart. A problem of data loss caused by exceptions such as a system failure is avoided, and security and reliability of data storage are ensured.

This step may be specifically implemented by the processor 302.

Optionally, the data recovery request may further carry time information. Correspondingly, a processing procedure may be as follows: The time series data management device obtains, by means of screening from the obtained to-be-recovered target data according to time information of the to-be-recovered target data, to-be-recovered target data that matches the time information carried in the data recovery request. The time information of the target data may be time information of time series data in the target data.

In an application scenario of the present invention, the time series data management device may directly recover all the obtained target data to the memory.

In an application scenario of the present invention, to prevent outdated target data from being recovered to the data storage block of the memory, the to-be-recovered target data that matches the time information carried in the data recovery request may be obtained from all the obtained data by means of screening. This step may be specifically implemented by the processor 302.

Optionally, the time series data management device may further recover the index entry in the persistent file to the memory. Correspondingly, a processing procedure may be as follows: The time series data management device obtains, at an interval of a preset detection period, each index entry that is in the location index table and that changes compared with a previous detection period, and stores each obtained index entry in the persistent file according to a sequence of updating time. This step may be specifically implemented by the processor 302.

The updating time may be a creation time of the index entry and a recording time of a storage location in the index entry.

As described above, when time series data storage is updated, information in the index entry corresponding to each object is also updated accordingly. For example, when the second time series data of the first object that is stored in the target data table is replaced with the first time series data, the third storage location recorded in the first index entry in the location index table needs to be replaced with the second storage location. That is, for an object in the location index table, a storage location corresponding to the object in the location index table may change at different time. During persistent storage, an index entry in which each storage location of a same object changes needs to be persistently stored.

Optionally, when receiving the data recovery request, the time series data management device traverses the persistent file according to a sequence of updating time, successively obtains at least one index entry stored in the persistent file, and recovers the obtained at least one index entry to the memory. This step may be specifically implemented by the processor 302.

As described above, for a same object, the persistent file may store index entries of the object at a plurality of different time, that is, a same object may be corresponding to index entries updated at the plurality of different time. When the persistent file includes a plurality of index entries for a same object, an index entry with a latest updating time may be obtained from the plurality of index entries for the same object.

Figure 5:
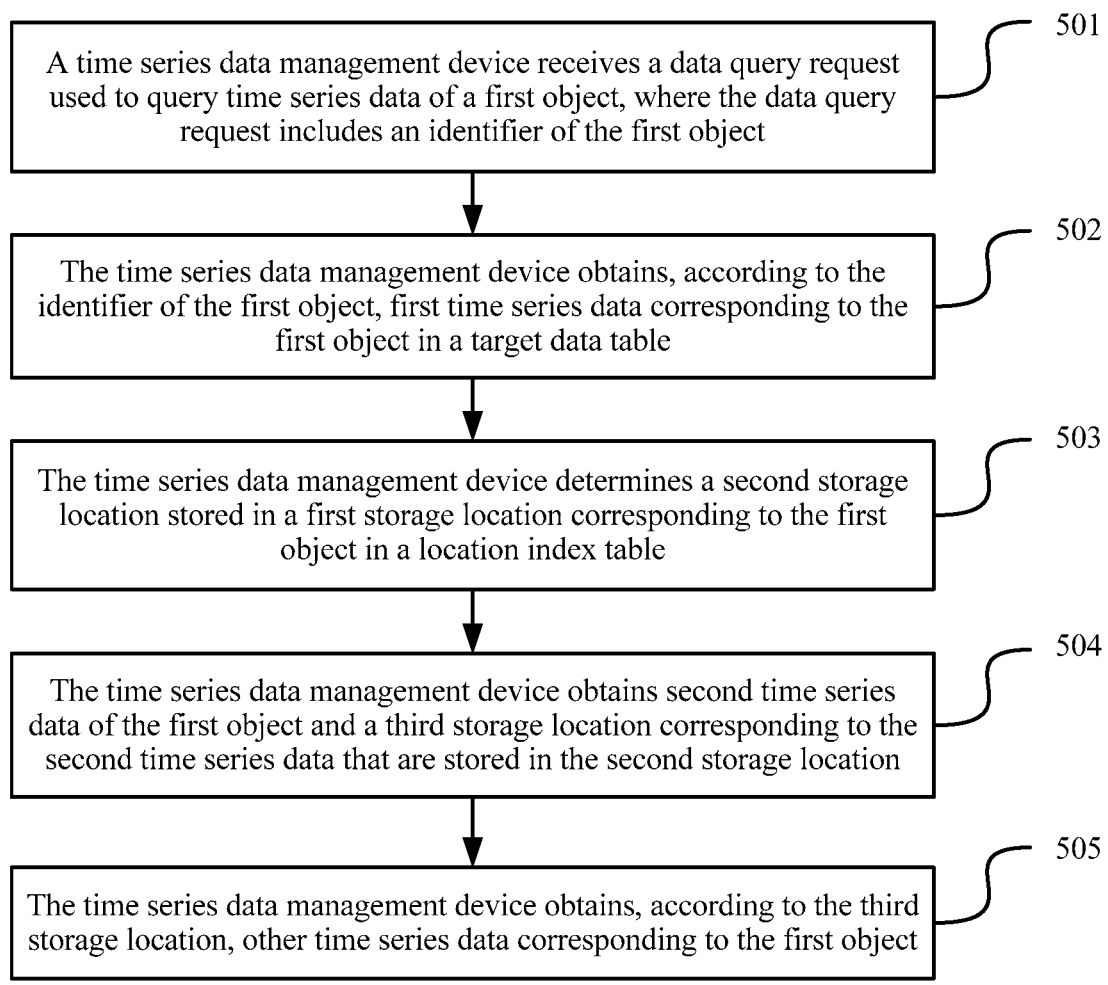
FIG. 5 is a step flowchart of a time series data management method according to an embodiment of the present invention.

On the basis of time series data storage implemented based on the foregoing steps 401 to 405, the user may further query time series data. As shown in FIG. 5, the foregoing time series data management method may be further used to query time series data of an object.

Step 501: A time series data management device receives a data query request used to query time series data of a first object, where the data query request includes an identifier of the first object.

In implementation, when a user needs to search for time series data of an object (that is, the first object), a terminal that can communicate with the time series data management device may be triggered by using an operation to send, to the time series data management device, the data query request used to query the time series data of the first object. The data query request may carry the identifier of the first object. Correspondingly, the time series data management device may receive the data query request, and parse the data query request to obtain the identifier of the first object that is carried in the data query request.

This step may be specifically implemented by the transceiver 301.

Step 502: The time series data management device obtains, according to the identifier of the first object, first time series data corresponding to the first object in a target data table, where the target data table records a plurality of pieces of time series data corresponding to a plurality of objects, and the plurality of objects are in a one-to-one correspondence with the plurality of pieces of time series data in the target data table.

This step may be specifically implemented by the processor 302.

Step 503: The time series data management device determines a second storage location that is in a location index table and that is stored in a first storage location corresponding to the first object, where the location index table is used to record storage locations of the plurality of pieces of time series data corresponding to the plurality of objects in the target data table, and for each object in the plurality of objects, a time series of time series data that is of the object and that is indicated by the storage locations in the location index table is before a time series of time series data of the object that is recorded in the target data table.

This step may be specifically implemented by the processor 302.

Step 504: The time series data management device obtains second time series data of the first object and a third storage location corresponding to the second time series data that are stored in the second storage location, where a time series of the second time series data is before that of the first time series data, and the third storage location is used to store third time series data of the first object and a fourth storage location corresponding to the third time series data.

This step may be specifically implemented by the processor 302.

Step 505: The time series data management device obtains, according to the third storage location, other time series data corresponding to the first object.

This step may be specifically implemented by the processor 302.

Optionally, the time series data management device may obtain, according to the following processing procedure, the other time series data corresponding to the first object. Specifically, the time series data management device obtains the third time series data and the fourth storage location corresponding to the third time series data that are stored in the third storage location, and obtains fourth time series data and a fifth storage location corresponding to the fourth time series data that are stored in the fourth storage location until the time series data management device obtains all time series data corresponding to the first object.

In implementation, after obtaining the third storage location corresponding to the second time series data, the time series data management device may obtain the third time series data and the fourth storage location corresponding to the third time series data that are stored in the third storage location. The fourth storage location may be used to store the fourth time series data and the fifth storage location corresponding to the fourth time series data. The fourth time series data may be time series data replaced with the third time series data, and the fourth time series data may be previous time series data of the third time series data in terms of a time series. After obtaining the fourth storage location, the time series data management device may obtain the fourth time series data and the fifth storage location corresponding to the fourth time series data that are stored in the fourth storage location. The fifth time series data may be time series data replaced with the fourth time series data. In terms of a time series, the fifth time series data may be previous time series data of the fourth time series data until all the time series data corresponding to the first object is obtained.

This step may be specifically implemented by the processor 302.

Optionally, the data query request may further carry query time information, and a corresponding processing procedure may be as follows: The time series data management device obtains, by means of screening, a query result from the obtained first time series data and second time series data of the first object and the obtained other time series data of the first object. Time information of time series data in the query result matches the query time information carried in the data query request.

This step may be specifically implemented by the processor 302.

For ease of understanding, the following uses a complete storage and query procedure for the time series data of the first object as an example to describe the time series data management method in detail. The time series data corresponding to the first object includes first time series data, second time series data, third time series data, . . . , $(n-1)^{th}$ time series data, and $n^{th}$ time series data, where n may be an integer greater than or equal to 2.

In a storage phase:

The time series data of the first object that is stored in the data table is the $n^{th}$ time series data in an initial phase. In this case, the first object does not have a corresponding index entry in the location index table.

In a first storage updating process, a data storage instruction carrying the $(n-1)^{th}$ time series data of the first object is received. In this case, the $n^{th}$ time series data of the first object that is stored in the target data table may be replaced with the $(n-1)^{th}$ time series data, and the $n^{th}$ time series data may be stored in the data storage block (a storage location of the $n^{th}$ time series data in the data storage block is a location A). In addition, a first index entry corresponding to the first object is established in the location index table, and the first index entry stores a mapping relationship between the first object and the location A (the location A may be specific physical address information, or may be logical storage address information). It should be noted that, because there is no other time series data before the $n^{th}$ time series data, only the $n^{th}$ time series data may be stored when the $n^{th}$ time series data is stored in the data storage block. Alternatively, the $n^{th}$ time series data and an initial address may be stored, and the initial address may be empty.

In a second storage updating process, a data storage instruction carrying the $(n-2)^{th}$ time series data of the first object is received. In this case, the $(n-1)^{th}$ time series data of the first object that is stored in the target data table may be replaced with the $(n-2)^{th}$ time series data, and the $(n-1)^{th}$ time series data may be stored in the data storage block (a storage location of the $(n-1)^{th}$ time series data in the data storage block is a location B). In addition, the storage location in the first index entry is updated: The location A is replaced with the location B. It should be noted that, when the $(n-1)^{th}$ time series data is stored in the data storage block, a mapping relationship between the $(n-1)^{th}$ time series data and the location A needs to be stored in the data storage block. The $(n-1)^{th}$ time series data and the location A may be stored as a 2-tuple in the data storage block, or the location A may be stored as an addition part of the $(n-1)^{th}$ time series data in the data storage block.

Reference is made to the foregoing procedure until the first time series data is completely stored.

In a query phase:

First, the first time series data of the first object may be directly obtained from the target data table.

Then, the second storage location in the mapping relationship may be determined according to the mapping relationship recorded in the first index entry, and further, the second time series data is obtained from the second storage location. When the second time series data is obtained from the second storage location, a third storage location that is corresponding to the second time series data and that is used to indicate a storage location of the third time series data is obtained.

Next, the third time series data is obtained from the third storage location.

Reference is made to the foregoing procedure until the $n^{th}$ time series data is completely obtained.

The time series data management device described in this solution may support both time series data storage processing and time series data query processing.

It should be noted that the time series data management method described in this embodiment of the present invention may not only be applicable to time series data management in a memory database, but also is applicable to time series data management in another storage medium. For example, the another storage medium includes but is not limited to a magnetic disk, a hard disk, a non-volatile random access memory, and the like.

In this embodiment of the present invention, during time series data management, all time series data is no longer stored in the target data table in a manner of one-by-one addition, but only latest time series data is stored in the target data table in a manner of updating and replacement. That is, each object is corresponding to only one row of data in the target data table, and replaced time series data may be stored in at least one data storage block other than the target data table. When the time series data of the first object needs to be queried, the time series data corresponding to the first object only needs to be obtained from the target data table. Further, other time series data of the first object may be directly queried in a storage location that is in the location index table and that is recorded in the first storage location corresponding to the first object, and the target data table does not need to be checked row by row. Therefore, efficiency of querying time series data is improved.

Figure 6:
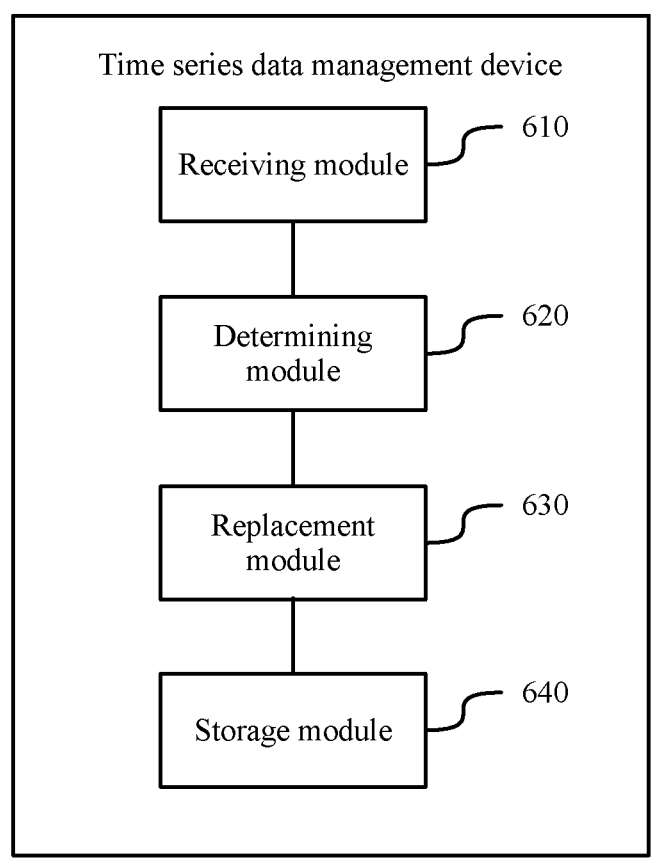
FIG. 6 is a structural block diagram of a time series data management apparatus according to an embodiment of the present invention.

Referring to FIG. 6, FIG. 6 shows a structural block diagram of a time series data management apparatus according to an embodiment of the present invention. In this embodiment of the present invention, the time series data management apparatus may be implemented as a part or all of a device by using software, hardware, or a combination thereof. The time series data management apparatus provided in this embodiment of the present invention may implement the procedure in FIG. 4 of the embodiment of the present invention, and the time series data management apparatus includes a receiving module 610, a determining module 620, a replacement module 630, and a storage module 640.

The receiving module 610 is configured to receive a first data storage instruction. The first data storage instruction includes first time series data of a first object and an identifier of the first object. The receiving module 610 may specifically implement the receiving function in step 401 and another implicit step in which the device receives information.

The determining module 620 is configured to determine, according to the identifier of the first object, second time series data that is corresponding to the first object and that is recorded in a target data table. The target data table records a plurality of pieces of time series data corresponding to a plurality of objects, and the plurality of objects are in a one-to-one correspondence with the plurality of pieces of time series data in the target data table. The determining module 620 may specifically implement the determining function in step 402 and another implicit step in which the device determines information.

The replacement module 630 is configured to replace the second time series data in the target data table with the first time series data. The replacement module 630 may specifically implement the replacement function in step 403 and another implicit step.

The storage module 640 is configured to: store the second time series data in a first data storage block; and store, in a first storage location corresponding to the first object in a location index table, a second storage location in which the second time series data in the first data storage block is located. A time series of the second time series data is before that of the first time series data, the location index table is used to store storage locations of the plurality of pieces of time series data corresponding to the plurality of objects in the target data table, and for each object in the plurality of objects, a time series of time series data that is of the object and that is indicated in the location index table is before a time series of time series data of the object that is recorded in the target data table. The storage module 640 may specifically implement the storage function in steps 404 and 405 and another implicit step in which the device stores information.

Optionally, the receiving module 610 is further configured to receive a second data storage instruction. The second data storage instruction includes the second time series data of the first object and the identifier of the first object.

The determining module 620 is further configured to determine, according to the identifier of the first object, third time series data that is corresponding to the first object and that is recorded in the target data table.

The replacement module 630 is further configured to replace the third time series data in the target data table with the second time series data.

The storage module 640 is further configured to: store the third time series data in a second data storage block; and store, in the first storage location, a third storage location in which the third time series data in the second data storage block is located.

Optionally, the storage module 640 is configured to:
store a mapping relationship between the third storage location and the second time series data in the first data storage block, where the mapping relationship includes the third storage location and the second time series data.

Optionally, the storage module 640 is configured to:
replace the third storage location stored in the first storage location with the second storage location.

Figure 7:
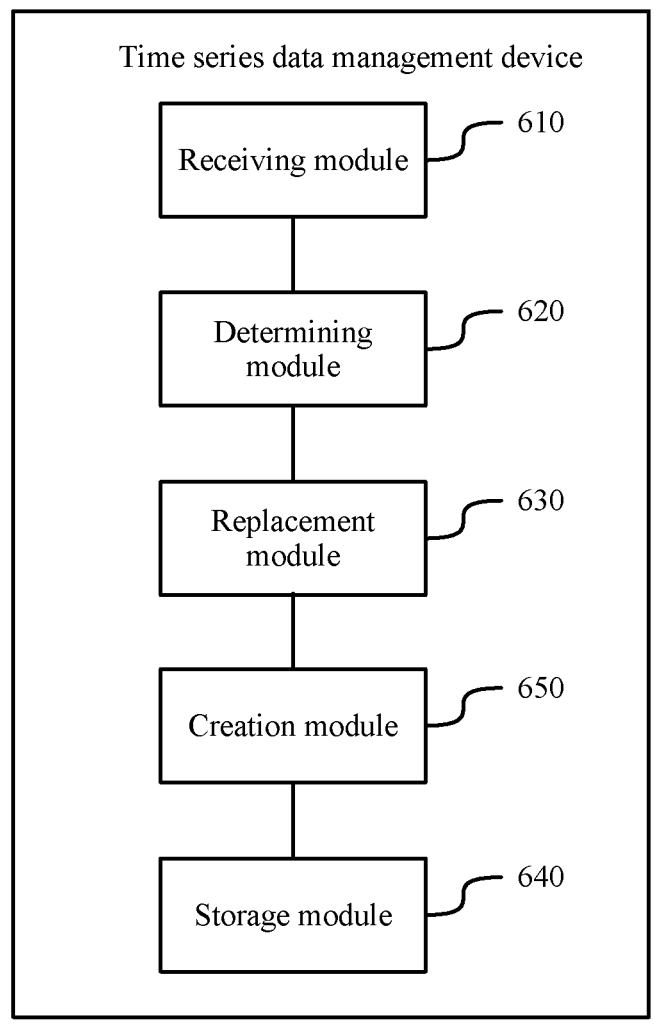
FIG. 7 is a structural block diagram of a time series data management apparatus according to an embodiment of the present invention.

Optionally, as shown in FIG. 7, the apparatus further includes:
a creation module 650, configured to: when a data storage amount of the first data storage block reaches an upper storage limit, create a third data storage block.

The storage module 640 is further configured to: store the second time series data in the third data storage block; and when the data storage amount of the first data storage block does not reach the upper storage limit, store the second time series data in the first data storage block.

Optionally, the determining module 620 is further configured to:
determine, from at least one data storage block other than the target data table according to time information of the second time series data, the first data storage block matching the time information of the second time series data, where the at least one data storage block is used to store time series data replaced from the target data table.

The storage module 640 is configured to store the second time series data in the determined first data storage block.

It should be noted that the receiving module 610 may be implemented by a transceiver, and the determining module 620, the replacement module 630, the storage module 640, and the creation module 650 may be implemented by a processor, by a processor and a memory together, or by a processor by executing a program instruction in a memory.

In this embodiment of the present invention, during time series data management, all time series data is no longer stored in the target data table in a manner of one-by-one addition, but only latest time series data is stored in the target data table in a manner of updating and replacement. That is, each object is corresponding to only one row of data in the target data table, and replaced time series data may be stored in at least one data storage block other than the target data table. When the time series data of the first object needs to be queried, the time series data corresponding to the first object only needs to be obtained from the target data table. Further, other time series data of the first object may be directly queried in a storage location that is in the location index table and that is recorded in the first storage location corresponding to the first object, and the target data table does not need to be checked row by row. Therefore, efficiency of querying time series data is improved.

Figure 8:
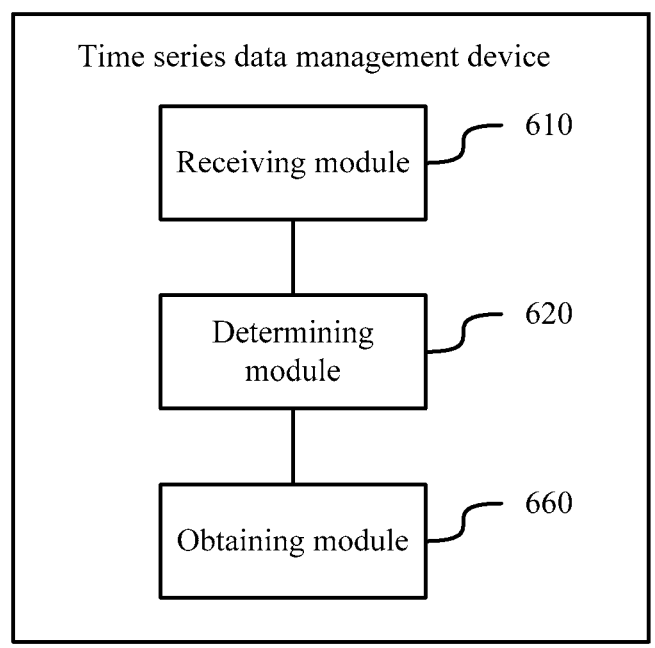
FIG. 8 is a structural block diagram of a time series data management apparatus according to an embodiment of the present invention.

Referring to FIG. 8, FIG. 8 shows a structural block diagram of a time series data management apparatus according to an embodiment of the present invention. In this embodiment of the present invention, the time series data management apparatus may be implemented as a part or all of a device by using software, hardware, or a combination thereof. The time series data management apparatus provided in this embodiment of the present invention may implement the procedure in FIG. 5 of the embodiment of the present invention, and the time series data management apparatus includes a receiving module 610, an obtaining module 660, and a determining module 620.

The receiving module 610 is configured to receive a data query request used to query time series data of a first object. The data query request includes an identifier of the first object. The receiving module 610 may specifically implement the receiving function in step 501 and another implicit step in which the device receives information.

The obtaining module 660 is configured to obtain, according to the identifier of the first object, first time series data corresponding to the first object in a target data table. The target data table records a plurality of pieces of time series data corresponding to a plurality of objects, and the plurality of objects are in a one-to-one correspondence with the plurality of pieces of time series data in the target data table. The obtaining module 660 may specifically implement the obtaining function in step 502 and another implicit step in which the device obtains information.

The determining module 620 is configured to determine a second storage location that is in a location index table and that is stored in a first storage location corresponding to the first object. The location index table is used to record storage locations of the plurality of pieces of time series data corresponding to the plurality of objects in the target data table, and for each object in the plurality of objects, a time series of time series data that is of the object and that is indicated by the storage locations in the location index table is before a time series of time series data of the object that is recorded in the target data table. The determining module 620 may specifically implement the determining function in step 503 and another implicit step in which the device determines information.

The obtaining module 660 is further configured to: obtain second time series data of the first object and a third storage location corresponding to the second time series data that are stored in the second storage location, where a time series of the second time series data is before that of the first time series data, and the third storage location is used to store third time series data of the first object and a fourth storage location corresponding to the third time series data; and obtain, according to the third storage location, other time series data corresponding to the first object. The obtaining module 660 may specifically implement the obtaining function in steps 504 and 505 and another implicit step in which the device obtains information.

Optionally, the obtaining module 660 is configured to:
obtain the third time series data and the fourth storage location corresponding to the third time series data that are stored in the third storage location; and
obtain fourth time series data and a fifth storage location corresponding to the fourth time series data that are stored in the fourth storage location until all time series data corresponding to the first object is obtained.

It should be noted that the obtaining module 660 may be implemented by a processor, by a processor and a memory together, or by a processor by executing a program instruction in a memory.

In this embodiment of the present invention, during time series data management, all time series data is no longer stored in the target data table in a manner of one-by-one addition, but only latest time series data is stored in the target data table in a manner of updating and replacement. That is, each object is corresponding to only one row of data in the target data table, and replaced time series data may be stored in at least one data storage block other than the target data table. When the time series data of the first object needs to be queried, the time series data corresponding to the first object only needs to be obtained from the target data table. Further, other time series data of the first object may be directly queried in a storage location that is in the location index table and that is recorded in the first storage location corresponding to the first object, and the target data table does not need to be checked row by row. Therefore, efficiency of querying time series data is improved.

It should be noted that, when the time series data management apparatus provided in the foregoing embodiments implements time series data management, division of the foregoing function modules is merely used as an example for description. In actual application, the functions may be allocated to different function modules for implementation according to a requirement. That is, an internal structure of the device is divided into different function modules to implement all or some functions described above. In addition, the time series data management apparatus provided in the foregoing embodiments belongs to a same concept as the embodiments of the time series data management method. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are not intended to limit this application. Any modification, equivalent replacement, or improvement made without departing from the spirit and principle of this application should fall within the protection scope of this application.

What is claimed is:

1. A time series data management method for querying time series data of an object, wherein the method comprises:
receiving a data query request, wherein the data query request comprises an identifier of a first object;
obtaining, according to the identifier of the first object, first time series data corresponding to the first object in a target data table, wherein the target data table comprises a plurality of pieces of time series data corresponding to a plurality of objects, and the plurality of objects are in a one-to-one correspondence with the plurality of pieces of time series data in the target data table;
determining a second storage location that is stored in a first storage location in a location index table, wherein the first storage location corresponds to the first object, wherein the location index table comprises storage locations of the plurality of pieces of time series data corresponding to the plurality of objects in the target data table, and for each object in the plurality of objects, a time series of time series data corresponding to the object and in the location index table is before a time series of time series data corresponding to the object and in the target data table;
obtaining second time series data of the first object and a third storage location corresponding to the second time series data that are stored in the second storage location, wherein a time series of the second time series data is before that of the first time series data, and the third storage location stores third time series data of the first object and a fourth storage location corresponding to the third time series data; and
obtaining, according to the third storage location, other time series data corresponding to the first object.

2. The method according to claim 1, wherein the method further comprises:
obtaining the third time series data and the fourth storage location corresponding to the third time series data that are stored in the third storage location; and
obtaining fourth time series data and a fifth storage location corresponding to the fourth time series data that are stored in the fourth storage location until all time series data corresponding to the first object is obtained.

3. A time series data management method for storing time series data of each object, wherein the method comprises:
receiving a first data storage instruction, wherein the first data storage instruction comprises first time series data of a first object and an identifier of the first object;
determining, according to the identifier of the first object, second time series data that is corresponding to the first object and that is comprised in a target data table, wherein the target data table comprises a plurality of pieces of time series data corresponding to a plurality of objects, and the plurality of objects are in a one-to-one correspondence with the plurality of pieces of time series data in the target data table;
replacing the second time series data in the target data table with the first time series data;

storing the second time series data in a first data storage block; and storing, in a first storage location in a location index table, a second storage location in which the second time series data in the first data storage block is located, wherein the first storage location corresponds to the first object, wherein a time series of the second time series data is before that of the first time series data, the location index table stores storage locations of the plurality of pieces of time series data corresponding to the plurality of objects in the target data table, and for each object in the plurality of objects, a time series of time series data corresponding to the object and in the location index table is before a time series of time series data corresponding to the object and in the target data table.

4. The method according to claim 3, wherein the method further comprises:

receiving a second data storage instruction, wherein the second data storage instruction comprises the second time series data of the first object and the identifier of the first object;

determining, according to the identifier of the first object, third time series data that is corresponding to the first object and that is comprised in the target data table;

replacing the third time series data in the target data table with the second time series data;

storing the third time series data in a second data storage block; and storing, in the first storage location, a third storage location in which the third time series data in the second data storage block is located.

5. The method according to claim 4, wherein the method further comprises:

storing a mapping relationship between the third storage location and the second time series data in the first data storage block, wherein the mapping relationship comprises the third storage location and the second time series data.

6. The method according to claim 4, wherein the method further comprises:

replacing the third storage location stored in the first storage location with the second storage location.

7. The method according to claim 3, wherein the method further comprises:

when a data storage amount of the first data storage block reaches an upper storage limit, creating a third data storage block, and storing the second time series data in the third data storage block; and when the data storage amount of the first data storage block does not reach the upper storage limit, storing the second time series data in the first data storage block.

8. The method according to claim 3, wherein the method further comprises:

determining, from at least one data storage block other than the target data table according to time information of the second time series data, the first data storage block matching the time information of the second time series data, wherein the at least one data storage block stores time series data replaced from the target data table; and storing the second time series data in the determined first data storage block.

9. A time series data management device, wherein the device is configured to query time series data of an object, the device comprises a transceiver, a memory, and a processor, the memory is configured to store a program and data, and the processor invokes the program stored in the memory, to process the data in the memory, wherein the processor is configured to receive, by using the transceiver, a data query request, wherein the data query request comprises an identifier of a first object; and the processor is further configured to: obtain, according to the identifier of the first object, first time series data corresponding to the first object in a target data table, wherein the target data table comprises a plurality of pieces of time series data corresponding to a plurality of objects, and the plurality of objects are in a one-to-one correspondence with the plurality of pieces of time series data in the target data table;

determine a second storage location and that is stored in a first storage location in a location index table, wherein the first storage location corresponds to the first object, wherein the location index table comprises storage locations of the plurality of pieces of time series data corresponding to the plurality of objects in the target data table, and for each object in the plurality of objects, a time series of time series data corresponding to the object and in the location index table is before a time series of time series data corresponding to the object and in the target data table;

obtain second time series data of the first object and a third storage location corresponding to the second time series data that are stored in the second storage location, wherein a time series of the second time series data is before that of the first time series data, and the third storage location stores store third time series data of the first object and a fourth storage location corresponding to the third time series data; and obtain, according to the third storage location, other time series data corresponding to the first object.

10. The device according to claim 9, wherein the processor is configured to:

obtain the third time series data and the fourth storage location corresponding to the third time series data that are stored in the third storage location; and obtain fourth time series data and a fifth storage location corresponding to the fourth time series data that are stored in the fourth storage location until all time series data corresponding to the first object is obtained.

11. A non-transitory computer-readable medium storing computer instructions for storing time series data of each object, that when executed by one or more processors, cause the one or more processors to perform operations that comprise:

receiving a first data storage instruction, wherein the first data storage instruction comprises first time series data of a first object and an identifier of the first object;

determining, according to the identifier of the first object, second time series data that is corresponding to the first object and that is comprised in a target data table, wherein the target data table comprises a plurality of pieces of time series data corresponding to a plurality of objects, and the plurality of objects are in a one-to-one correspondence with the plurality of pieces of time series data in the target data table;

replacing the second time series data in the target data table with the first time series data;

storing the second time series data in a first data storage block; and storing, in a first storage location in a location index table, a second storage location in which the second time series data in the first data storage block is located, wherein the first storage location corresponds to the first object, wherein a time series of the second time series data is before that of the first time series data, the location index table stores storage locations of the plurality of pieces of time series data corresponding to the plurality of objects in the target data table, and for each object in the plurality of objects, a time series of time series data corresponding to the object and in the location index table is before a time series of time series data corresponding to the object and in the target data table.

12. The medium according to claim 11, wherein the operations further comprise:
receiving a second data storage instruction, wherein the second data storage instruction comprises the second time series data of the first object and the identifier of the first object;
determining, according to the identifier of the first object, third time series data that is corresponding to the first object and that is comprised in the target data table;
replacing the third time series data in the target data table with the second time series data;
storing the third time series data in a second data storage block; and
storing, in the first storage location, a third storage location in which the third time series data in the second data storage block is located.

13. The medium according to claim 12, wherein the operations further comprise:
storing a mapping relationship between the third storage location and the second time series data in the first data storage block, wherein the mapping relationship comprises the third storage location and the second time series data.

14. The medium according to claim 12, wherein the operations further comprise:
replacing the third storage location stored in the first storage location with the second storage location.

15. The medium according to claim 11, wherein the operations further comprise:
when a data storage amount of the first data storage block reaches an upper storage limit, creating a third data storage block, and storing the second time series data in the third data storage block; and
when the data storage amount of the first data storage block does not reach the upper storage limit, storing the second time series data in the first data storage block.

16. The medium according to claim 11, wherein the operations further comprise:
determining, from at least one data storage block other than the target data table according to time information of the second time series data, the first data storage block matching the time information of the second time series data, wherein the at least one data storage block stores time series data replaced from the target data table; and
storing the second time series data in the determined first data storage block.

* * * * *

UNITED STATES PATENT AND TRADEMARK OFFICE
CERTIFICATE OF CORRECTION

PATENT NO. : 11,269,902 B2
APPLICATION NO. : 16/420482
DATED : March 8, 2022
INVENTOR(S) : Weijie Ou and Zhibiao Chen It is certified that error appears in the above-identified patent and that said Letters Patent is hereby corrected as shown below:

On the Title Page

Item (57) ABSTRACT, Column 2/Line 12 – Delete "location," and insert -- location. --.

In the Claims

Column 26/Line 15 (Approx.) – In Claim 9, delete "and that" and insert -- that --.

Signed and Sealed this
Twenty-second Day of November, 2022

Katherine Kelly Vidal
*Director of the United States Patent and Trademark Office*